US012723706B2

(12) United States Patent
Wang

(10) Patent No.: US 12,723,706 B2
(45) Date of Patent: Sep. 1, 2026

(54) FOLDABLE VACUUM CLEANER STAND

(71) Applicant: Jia Xing Jie Di Trading Co., ltd., Zhejiang (CN)

(72) Inventor: Shijie Wang, Zhejiang (CN)

( * ) Notice: Subject to any disclaimer, the term of this patent is extended or adjusted under 35 U.S.C. 154(b) by 0 days.

(21) Appl. No.: 18/826,306

(22) Filed: Sep. 6, 2024

(65) Prior Publication Data

US 2025/0354648 A1 Nov. 20, 2025

(30) Foreign Application Priority Data

May 15, 2024 (CN) ........................ 202410602111.3

(51) Int. Cl.
*F16M 11/38* (2006.01)
*A47L 9/00* (2006.01)

(52) U.S. Cl.
CPC ............ *F16M 11/38* (2013.01); *A47L 9/0063* (2013.01)

(58) Field of Classification Search
CPC ........ F16M 11/38; F16M 11/40; F16M 11/24; F16M 11/2021; A47L 9/0063; A47L 9/0054
USPC ....... 248/122.1, 123.11, 123.2, 125.2, 125.9, 248/150, 149, 346.01, 346, 6, 349.1, 248/346.3, 460, 461, 462, 458, 455, 454, 248/456, 457; 211/195, 19–24
See application file for complete search history.

(56) References Cited

U.S. PATENT DOCUMENTS 3,958,786 A * 5/1976 Mann ..................... F16M 11/10 211/195
5,165,634 A * 11/1992 Garbuzov ............. F16M 11/38 84/327
7,686,272 B2 * 3/2010 King ........................ A47G 1/12 248/458
7,717,377 B1 * 5/2010 Corrado ................... G10G 5/00 248/150
8,360,252 B1 * 1/2013 Fagan ...................... B62H 3/10 211/21
8,387,938 B2 * 3/2013 Lin ......................... G06F 1/166 248/397
2020/0029760 A1 * 1/2020 Seo ..................... A47L 11/4038
2021/0345848 A1 * 11/2021 Jeon ...................... A47L 9/2873

* cited by examiner

*Primary Examiner* — Alfred J Wujciak
(74) *Attorney, Agent, or Firm* — Hawaii Patent Services; Nathaniel K. Fedde; Kenton N. Fedde

(57) ABSTRACT

A foldable vacuum cleaner stand comprises a base and a support frame body, wherein the left end of the base is provided with a retaining frame for limiting the floor brush of the vacuum cleaner, and the right end of the base is provided with at least two support plates, which are fixedly installed at the front and rear sides of the base respectively; the support frame body is located above the right end of the base and extends obliquely upward in the direction of the retaining frame, while two support plates are located at the bottom of the inner side of the support frame body; and support bolts are inserted between the front and rear sides of the support frame body and the support plates on the same side.

6 Claims, 9 Drawing Sheets

B

FOLDABLE VACUUM CLEANER STAND

CROSS-REFERENCE TO RELATED APPLICATIONS

This application claims the priority of China Patent Application No. 202410602111.3 filed on May 15, 2024, entitled "Foldable Vacuum Cleaner Stand", all the contents and amendments of which are incorporated into this application by reference.

TECHNICAL FIELD

The present disclosure relates to the technical field of vacuum cleaner stands, in particular to a foldable vacuum cleaner stand.

BACKGROUND

The vacuum cleaner stand is a kind of equipment for storing and fixing a vacuum cleaner, which can assist users to manage vacuum cleaners effectively, so that the vacuum cleaner does not occupy too much space and can be conveniently used. In addition, in practical use, some vacuum cleaner stands are also equipped with hooks or hangers to facilitate users to hang accessories such as nozzle and brushes, making the whole cleaning tool more orderly, which not only saves space, but also makes the cleaning tool more tidy and convenient to take. In a word, the vacuum cleaner stand, as a common small household appliance accessory, plays an important role in the effective management and utilization of space, and with the progress of science and technology and the improvement of people's requirements for quality of life, its function and design are constantly innovating and improving.

Among the existing China patents, the patent No. CN210749006U discloses a clip-on vacuum cleaner stand. The support part of this patent is arranged at 90 degrees relative to the base, and the center of gravity is high, leading to a result that when the vacuum cleaner is supported, the stability is not high and may easily fall. Moreover, the patent is difficult to fold, and a large space is occupied when the vacuum cleaner stand is transported or stored.

Therefore, there is a need to put forward a new type of vacuum cleaner stand, which may make the vacuum cleaner more stable and difficult to topple, and the stand can be conveniently transported or stored.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present disclosure provides a foldable vacuum cleaner stand to solve the problems that the existing vacuum cleaner stand is likely to topple and cannot be folded.

In order to achieve the above object, the present disclosure adopts the following technical solution:

The present disclosure provides a foldable vacuum cleaner stand, which includes a base and a support frame body; a left end of the base is provided with a retaining frame for limiting a floor brush of a vacuum cleaner, and a right end of the base is provided with at least two support plates, which fixedly installed on the front and rear sides of the base respectively; and the support frame body is positioned above the right end of the base and extends obliquely upwards towards the retaining frame, while the two support plates are positioned at the bottom of the inner side of the support frame body, and support bolts are inserted between the front and rear sides of the support frame body and the support plates on a same side; and a part of the support frame body below the support bolts is set as a mating part, the two support plates are both provided with through slots on the right side of the mating part, and a limit rod for limiting the mating part is inserted between the two through slots; the front end and rear end of the limit rod pass through the through slots on a same side, and a part of the limit rod passing through the through slots is set as a second limit part; and limit bolts located on the left side of the mating part are inserted into both the two support plates, and springs are installed between the front and rear ends of the limit rod and the support bolts on a same side.

The present disclosure further provides a foldable vacuum cleaner stand, which includes a base and a support frame body; the base is provided with a blocking member for limiting a floor brush of a vacuum cleaner and a support member arranged opposite to the blocking member, and the support frame body is rotatably connected with the support member and has an erected state and a folded state; when the support frame body is in the erected state, and the support frame body inclines towards the blocking member; a pivot is inserted between the support frame body and the support member, and the support frame body rotates with the support member through the pivot; a part of the support frame body located below the pivot is set as a mating part, and the support member is provided with a through slot located within a rotating range of the mating part; a movable second limit member is inserted into the through slot, and the second limit member is used for limiting one side of the mating part; a first limit member located within the rotating range of the mating part is also inserted into the support member, and the first limit member is used for limiting the other side of the mating part; and an elastic member is installed between the second limit member and the pivot, and the elastic member pulls the second limit member to move up.

The present disclosure further provides a foldable vacuum cleaner stand, which includes a base and a support frame body; the base is provided with a blocking member for limiting a floor brush of a vacuum cleaner and a support member arranged opposite to the blocking member; and the support frame body is rotatably connected with the support member and has an erected state and a folded state; the support frame body extends obliquely towards the blocking member, and a limit structure is arranged between the support member and the support frame body; when the support frame body is in the erected state, the limit structure is used for limiting and fixing the support frame body.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
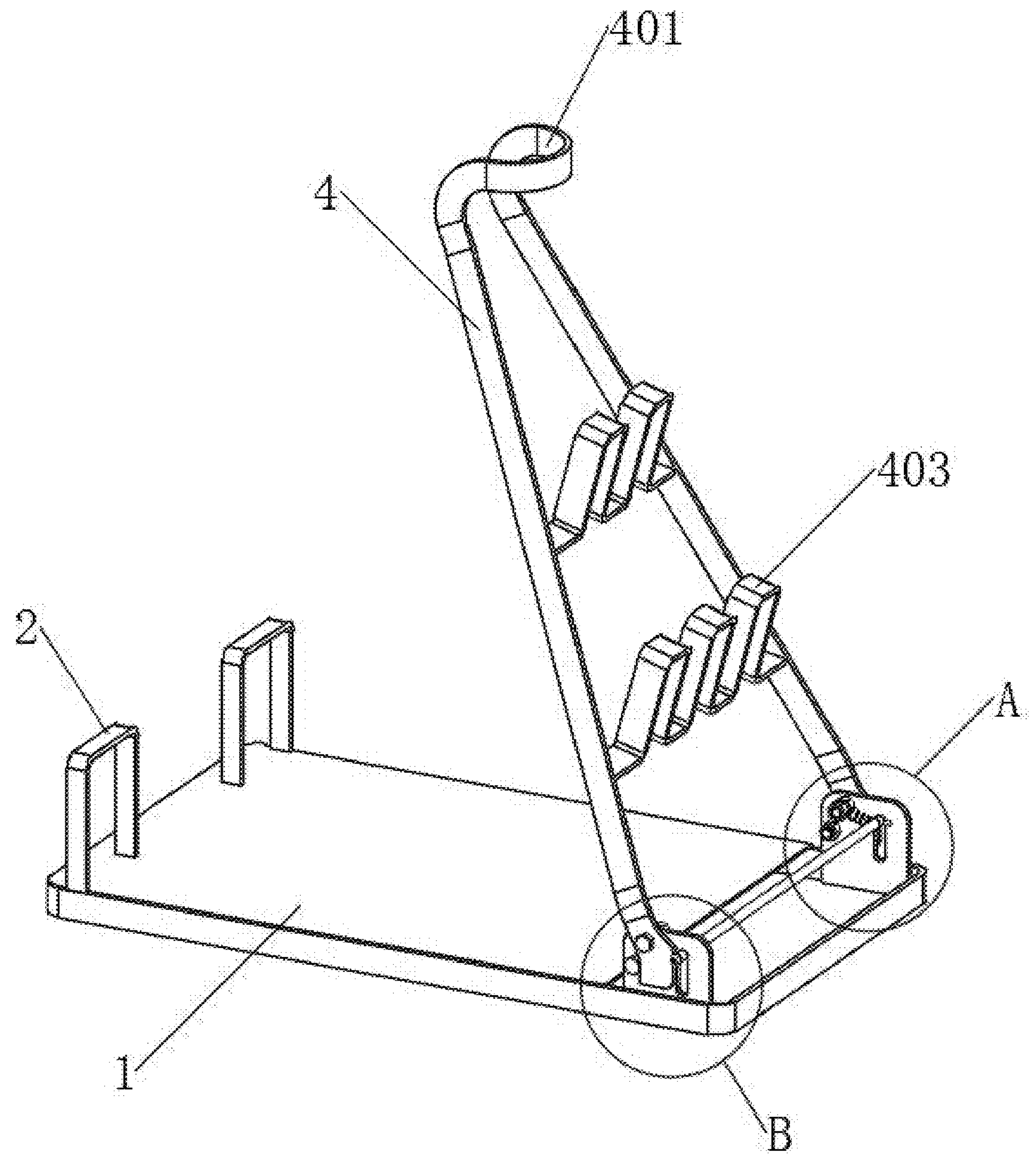
FIG. 1 is a schematic structural diagram of the present disclosure.
Figure 2:
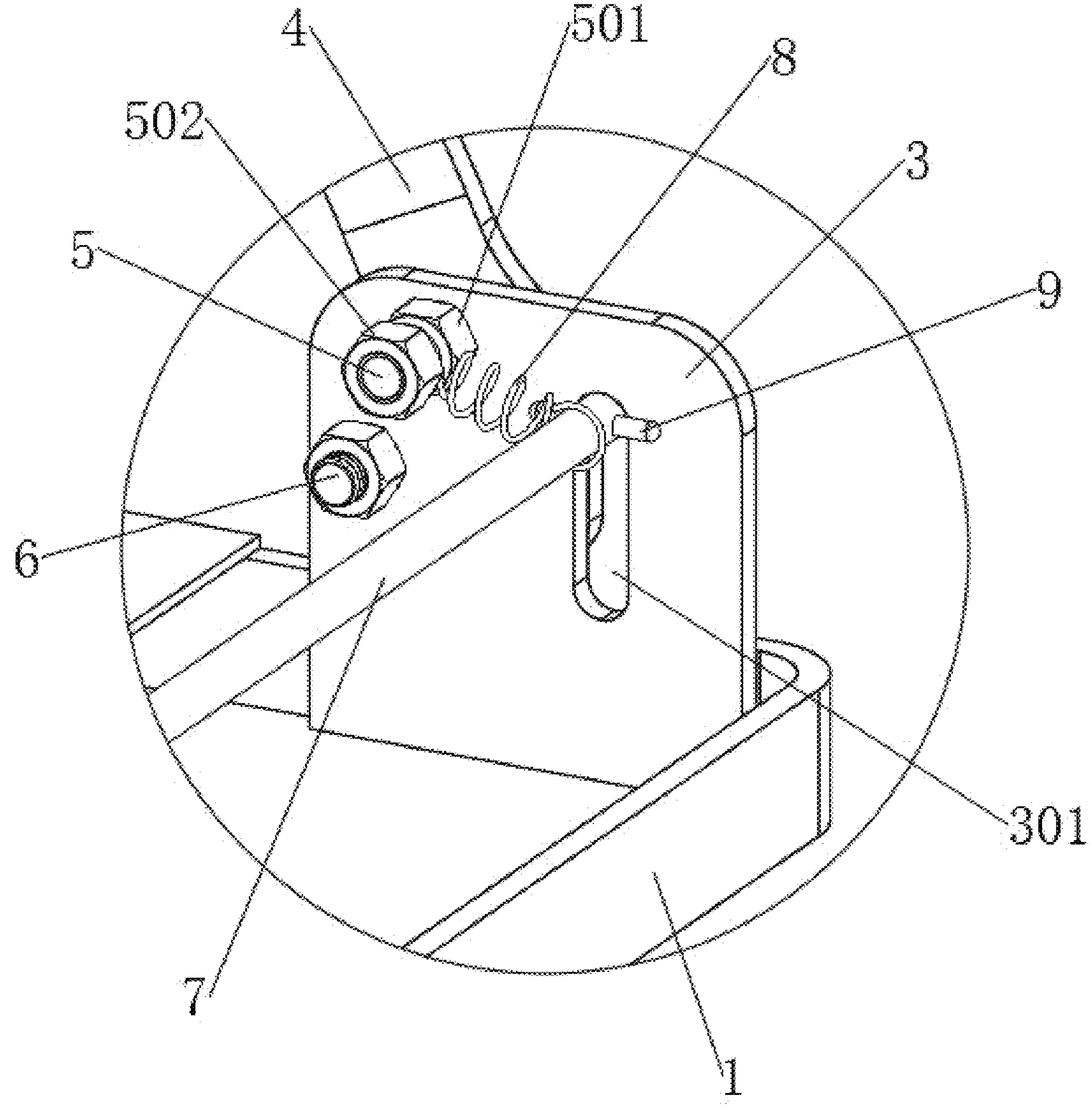
FIG. 2 is a partially enlarged schematic view at A in FIG. 1 of the present disclosure.
Figure 3:
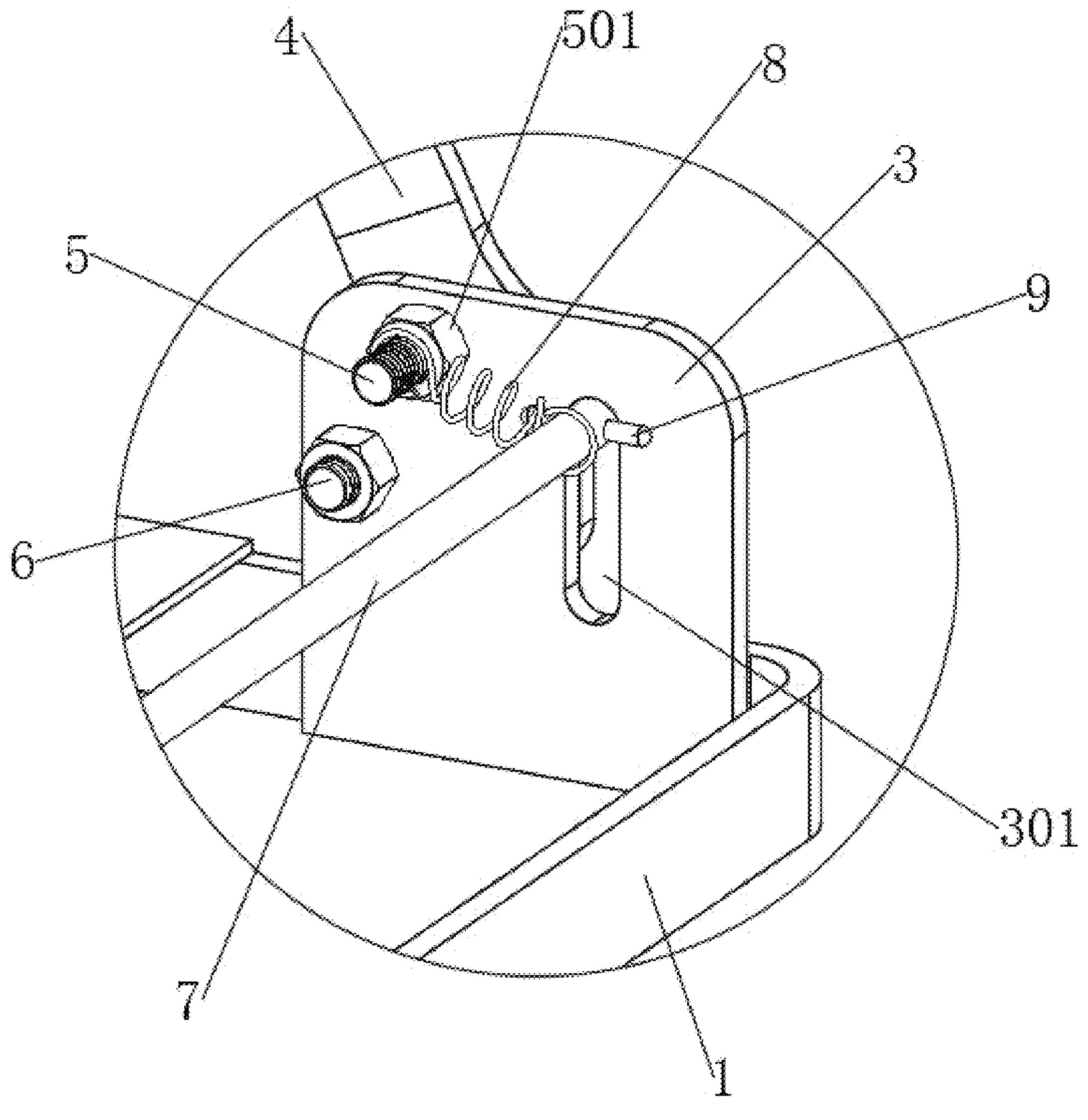
FIG. 3 is a state diagram of FIG. 2 when the second nut is removed.
Figure 4:
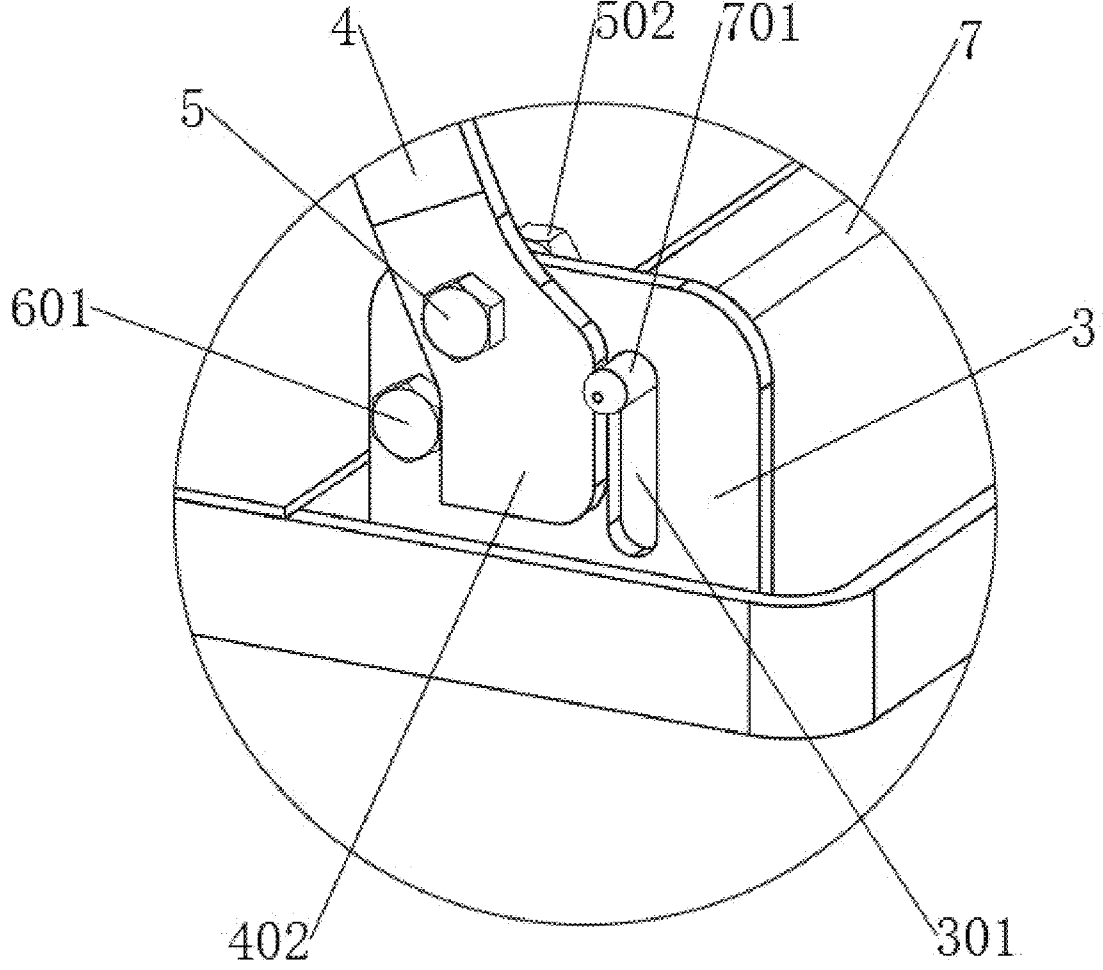
FIG. 4 is a partially enlarged schematic view at B in FIG. 1 according to the present disclosure.

Reference signs: Base (1); Retaining frame (2); Support plate (3); Through slot (301); Support frame body (4); Concave part (401); Mating part (402); Shelf (403); Support bolt (5); First nut (501); Second nut (502); Limit bolt (6); First limit part (601); Limit rod (7); Second limit part (701); Spring (8); Pin (9); Inclined plate (10); Convex part (11); Circular hole (12); Vacuum cleaner trunk (13); Vacuum cleaner floor brush (14).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Please refer to FIG. 1 to FIG. 6:

The present disclosure provides a foldable vacuum cleaner stand, which includes a base 1 and a support frame body 4. The left end of the base 1 is provided with a retaining frame 2 for limiting a vacuum cleaner floor brush 14 of the vacuum cleaner. The right end of the base 1 is provided with at least two support plates 3, which are fixedly installed at the front and rear sides of the base 1, respectively. The support frame body 4 is located above the right end of the base 1 and extends obliquely upward in the direction of the retaining frame 2; and the two support plates 3 are located at the bottom inside of the support frame body 4.

In this embodiment, there are at least two retaining frames 2, and the two retaining frames 2 are distributed in front and back intervals. The top of the support frame body 4 is provided with a concave part 401 for supporting the vacuum cleaner trunk 13. The distance between the two retaining frames 2 is greater than the width of the upper end of the support frame body 4 from front to back, and a shelf 403 is installed inside the support frame body 4.

Figure 6:
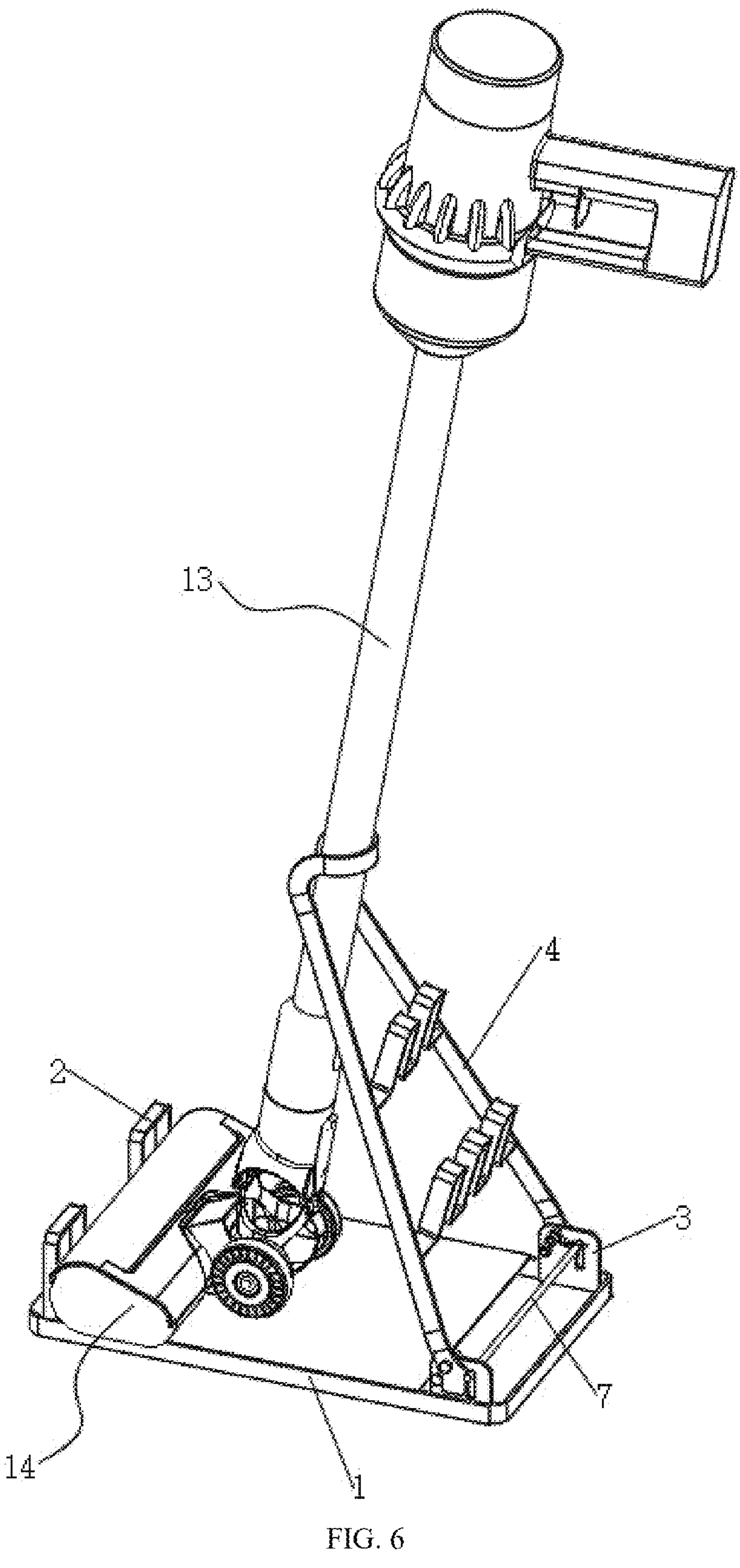
FIG. 6 is a state diagram when the present disclosure is used.

In this embodiment, as shown in FIG. 6, when the vacuum cleaner is supported by the vacuum cleaner stand, the vacuum cleaner floor brush 14 of the vacuum cleaner is placed on the upper surface of the base 1, and at the same time, the left side of the vacuum cleaner floor brush 14 of the vacuum cleaner is blocked and limited by the two blocking brackets 2, while the vacuum cleaner trunk 13 is clamped into the concave part 401 of the support fame body 4.

Therefore, when the vacuum cleaner is supported, the support frame body 4, the vacuum cleaner and the base 1 can form a triangular structure, so that the vacuum cleaner is placed more stably and is not prone to toppling; meanwhile, the inclined support frame body 4 can lower the center of gravity of the vacuum cleaner stand and is not prone to toppling when the vacuum cleaner stand is erected. The shelf 403 on the support frame body 4 can hold vacuum cleaner accessories such as nozzle and brushes.

According to the above, the support bolts 5 are inserted between the front and rear sides of the support frame body 4 and the support plates 3 on the same side, and the part of the support frame body 4 below the support bolts 5 is set as the mating part 402. The two support plates 3 are both provided with the through slots 301 on the right side of the mating part 402, and a limit rod 7 for limiting the mating part 402 is inserted between the two through slots 301. The front and rear ends of the limit rod 7 pass through the through the through slots 301 on the same side, and the part of the limit rod 7 penetrating through the through slot 301 is set as a second limit part 701. Limit bolts 6 located on the left side of the mating part 402 are inserted into both support plates 3, and springs 8 are installed between the front and rear ends of the limit rod 7 and the support bolt 5 on the same side.

In this embodiment, the support bolt 5 is rotatably connected with the support frame body 4, and the part of the support bolt 5 penetrating into the support plate 3 is sheathed with a first nut 501 and a second nut 502. One end of the spring 8 sheathes on the support bolt 5 and is located between the first nut 501 and the second nut 502, while the other end of the spring 8 sheathes outside the limit rod 7. The through slot 301 is vertically arranged, and the limit rod 7 is slidably connected with the through slot 301. Pins 9 located inside the support plate 3 are inserted into the front and rear ends of the limit rod 7. When the limit rod 7 is located at the bottom of the through slot 301, the second limit part 701 is located below the mating part 402, and the front and rear ends of the limit bolt 6 penetrate through the support plate 3. The part of the limit bolt 6 located outside the support plate 3 is set as a first limit part 601, and the first limit part 601 is located on the left side of the mating part 402.

The elastic member is not limited to the spring 8. In other embodiments, the elastic member can also be a component made of other elastic materials, elastic plastic, etc. Of course, the elastic member is not limited to being only installed between the support bolt 5 and the limit rod 7, and it may be also between the limit rod 7 and the bottom of the through slot 301, so that when the elastic member is compressed, it can still provide an upward elastic force for the limit rod 7.

In this embodiment, the limit rod 7 can slide up and down in the through slot 301, and the spring 8 has a contractive elasticity when it is in a stretched state, so that when the limit rod 7 is not pushed by external force, the spring 8 pulls the limit rod 7 to the top of the through slot 301 by the resilience and stays at the current position. The pins 9 at the front and rear ends can limit the front and rear ends of the limit rod 7, so that the limit rod 7 will not be greatly displaced in the front and rear direction.

In this embodiment, the support frame body 4 can be turned left and right through the rotary connection with the support bolt 5, but through the cooperation of the first limit part 601 and the second limit part 701, the left and right sides of the mating part 402 can be limited respectively, so that the support frame body 4 cannot be turned left and right after being erected.

Figure 5:
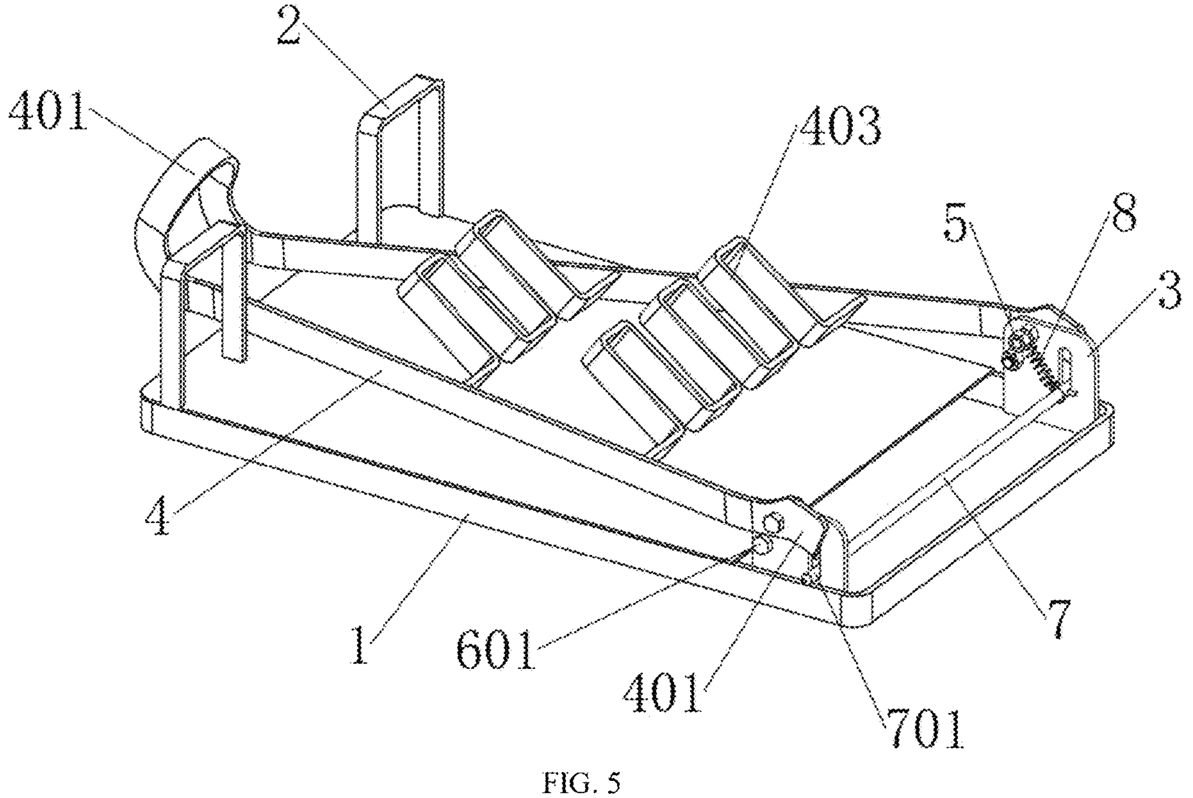
FIG. 5 is a state diagram of a folded state according to the present disclosure.

When the support frame body 4 needs to be turned over and folded, an external force is applied to push the limit rod 7 to slide down to the bottom of the through slot 301, and then the second limit part 701 will be located below the right side of the mating part 402, so that the second limit part 701 will be released from the limit on the right side of the mating part 402. Subsequently, the support frame body 4 can be turned to the left to be in a horizontal state and attached to the base 1, and the upper end of the support frame body 4 is placed between two retaining frames 2, as shown in FIG. 5. In this way, the vacuum cleaner stand can be folded, and the packaging and transportation volume or storage space of the vacuum cleaner stand can be reduced.

When the folded vacuum cleaner stand is used, the limit rod 7 is pushed to slide to the bottom of the through slot 301 in the same way, and then the support frame body 4 is pushed to turn over to the right. When the support frame body 4 is turned over, if the left side of the mating part 402 contacts with the first limit part 601, the external force applied to the limit rod 7 can be removed, and then the spring 8 pulls the limit rod 7 to slide to the top of the through slot 301 by the resilience. That is, the second limit part 701 will limit the right side of the mating part 402, so that the support frame body 4 can be kept in an erected state. Therefore, in this way, when the vacuum cleaner stand is used, the support frame body 4 can be directly turned upside down and erected for use, which is convenient and quick for use, and the complicated installation process is omitted.

Conclusion:

By the rotary connection between the support frame body 4 and the support plate 3, when the support frame body 4 is erected, the first limit part 601 and the second limit part 701 can limit the rotation of the support frame body 4, so that the support frame body 4 always stays in the erected state. When it needs to be folded, it only needs to move down the limit rod 7, and then the second limit part 701 releases the limit on the support frame body 4. Subsequently, the support frame body 4 can rotate and be folded and attached to the base 1. Therefore, in this way, the support frame body 4 can be folded, and the transportation packaging volume or storage space of the support frame body 4 can be reduced. Moreover, when the vacuum cleaner stand is used, the support frame body 4 can be directly turned upside down and erected for use, which is convenient and quick to use, and the complicated installation process is omitted.

By inclining the support frame body 4, the support frame body 4, the vacuum cleaner and the base 1 can form a triangular structure when supporting the vacuum cleaner, so that the vacuum cleaner is placed more stably and is not prone to toppling; meanwhile, the inclining support frame body 4 can lower the center of gravity of the vacuum cleaner stand and is not prone to toppling when the vacuum cleaner stand is erected.

Figure 7:
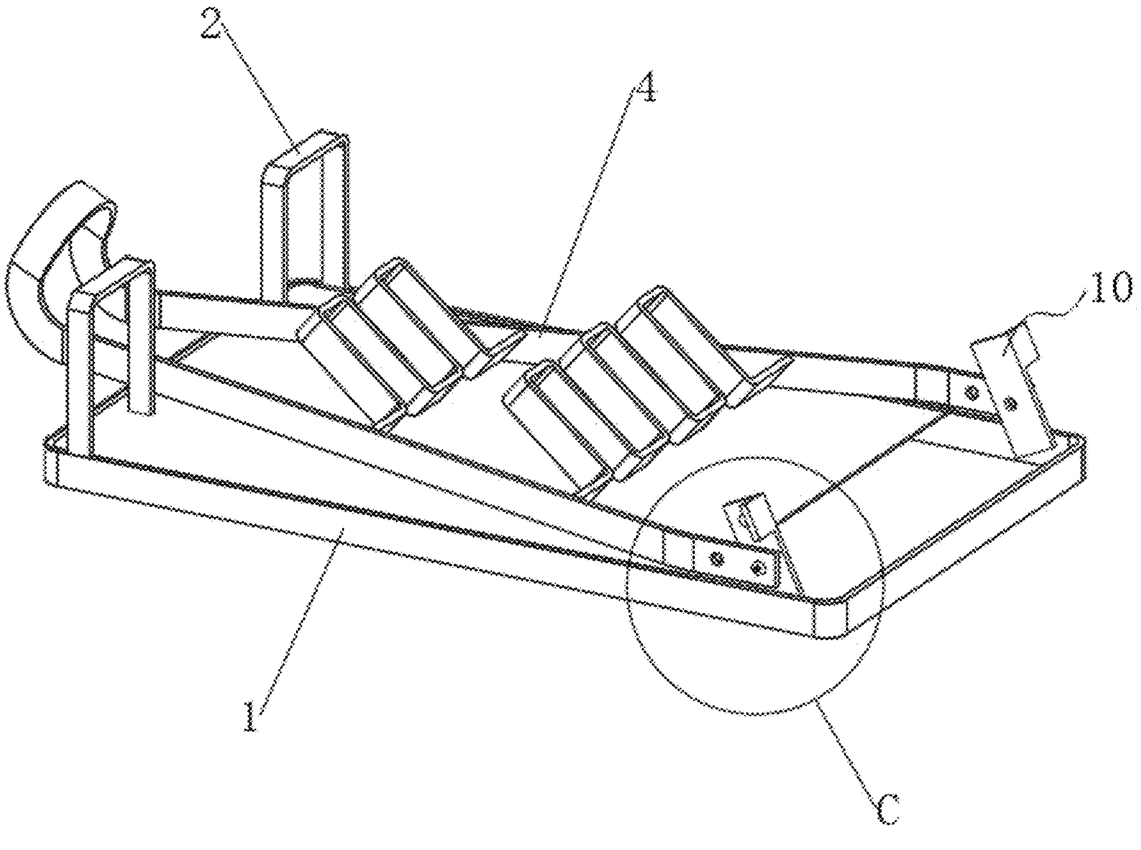
FIG. 7 is a structural schematic diagram of another embodiment of the present disclosure.
Figure 8:
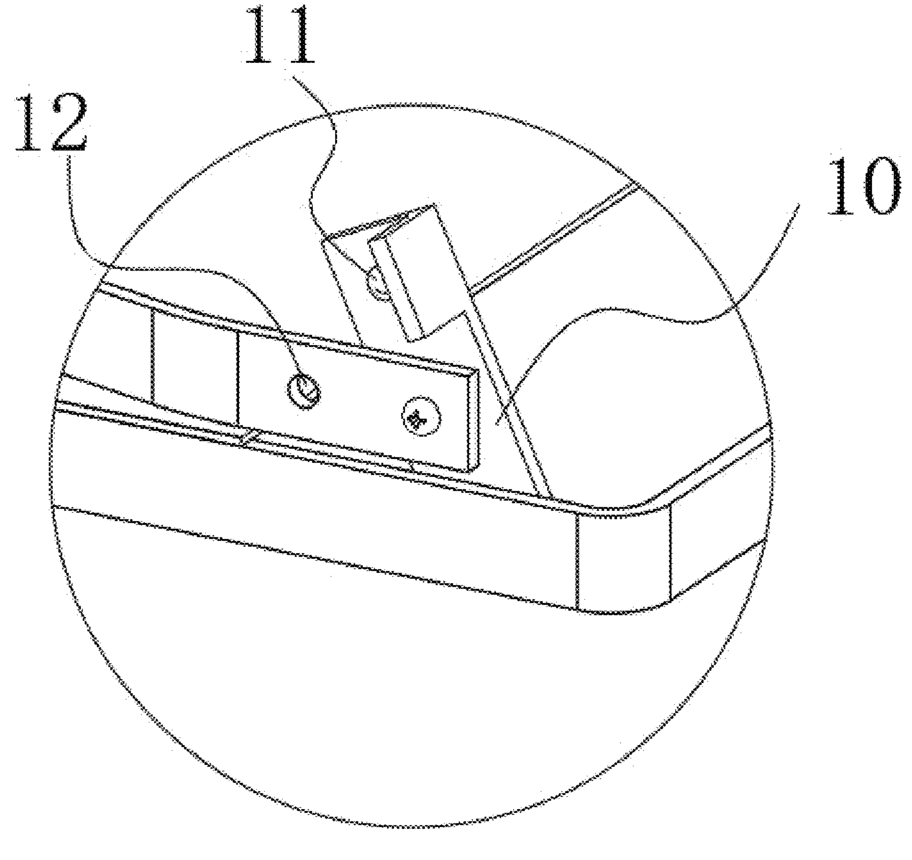
FIG. 8 is a partially enlarged schematic view at C in FIG. 7 of the present disclosure.
Figure 9:
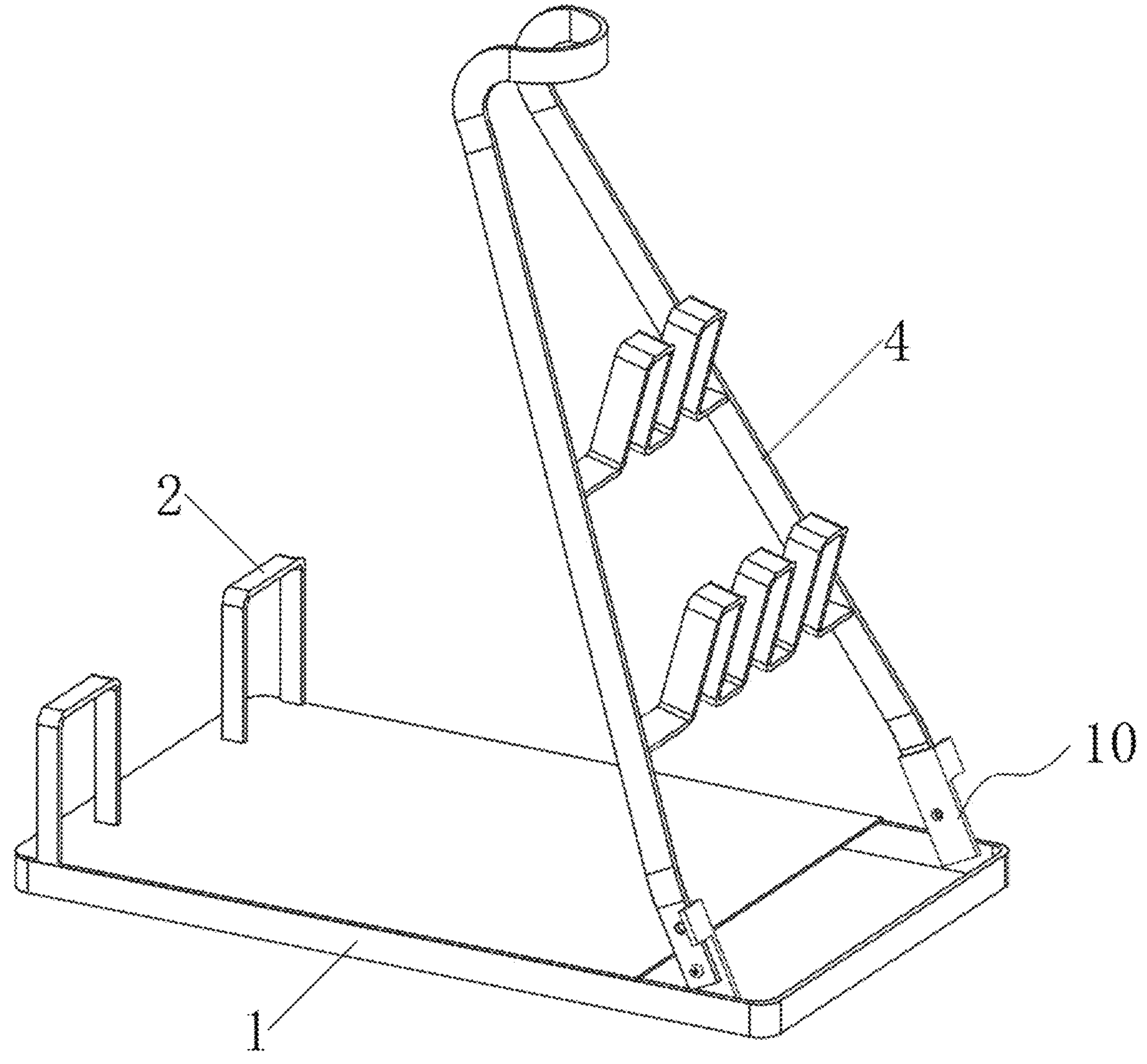
FIG. 9 is a state diagram of an erected state according to another embodiment of the present disclosure.

In another embodiment of that present disclosure, as shown in FIGS. 7 to 9:

The two support plates 3 are replaced by two inclined plates 10, which are rotatably connected with the support frame body 4 and have an erected state and a folded state. The inclination of the inclined plates 10 is the same as that of the support frame body 4, and the outer side of the inclined plates 10 is provided with hemispherical convex parts 11, and the front and rear sides of the lower end of the support frame body 4 are provided with circular holes 12 for matching with the convex parts 11. Therefore, when the vacuum cleaner stand is used, after the support frame body 4 is erected, the convex part 11 will slide into the circular hole 12 and be engaged with the circular hole 12, thereby fixing the support frame body 4; otherwise, if the support frame body 4 is pushed to turn over downwards, the convex part 11 will slide out of the circular hole 12, and then the vacuum cleaner stand can be folded.

In other embodiments, the limit structure is not limited to the clamping mode between the convex part 11 and the circular hole 12, but also can adopt magnetic attraction, bolt connection, snap connection and other modes.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A foldable vacuum cleaner stand, comprising a base and a support frame body, wherein the base is provided with a blocking member for retaining a floor brush of a vacuum cleaner and a support member arranged opposite to the blocking member, and the support frame body is rotatably connected with the support member and has an erected state and a folded state;

when the support frame body is in the erected state, the support frame body inclines towards the blocking member;

a pivot is inserted between the support frame body and the support member, and the support frame body rotates with the support member through the pivot;

a part of the support frame body located below the pivot is set as a mating part, and the support member is provided with a through slot located within a rotating range of the mating part; a movable second limit member is inserted into the through slot, and the second limit member is used for limiting one side of the mating part; a first limit member located within the rotating range of the mating part is also inserted into the support member, and the first limit member is used for limiting the other side of the mating part; and wherein, an elastic member is installed between the second limit member and the pivot, and the elastic member pulls the second limit member to move up to a top of the through slot.

2. The foldable vacuum cleaner stand according to claim 1, wherein the foldable vacuum cleaner stand comprises at least two blocking members, wherein the blocking member is one of the at least two blocking members, and each of the at least two blocking members is a retaining frame arranged on the base, and the at least two retaining frames are distributed in parallel at intervals.

3. The foldable vacuum cleaner stand according to claim 2, wherein the foldable vacuum cleaner stand comprises two support members, wherein the support member is one of the two support members, and each of the two support members is a support plate fixedly installed on a respective side of the base and each of the two support plates is vertically arranged relative to the at least two blocking members; the through slot is one of two through slots and each of the two through slots is provided on a respective support member of the two support members, the support frame body is rotatably installed relative to the two support plates and each of the two support plates is arranged so that the through slots of the respective two support plates are provided opposite to each other.

4. The foldable vacuum cleaner stand according to claim 3, wherein the pivot is a support bolt, which is rotatably connected with the support frame body; the second limit member is a limit rod, which is inserted between the two through slots; and both ends of the limit rod pass through the through slots on a same side and the limit rod is set as a second limit part.

5. The foldable vacuum cleaner stand according to claim 4, wherein the elastic member is a spring, which is installed between the limit rod and the support bolt; the first limit member is a limit bolt, and one end of the limit bolt penetrates through the support plate and is set as a first limit part.

6. The foldable vacuum cleaner stand according to claim 5, wherein the mating part, the first limit part and the second limit part are all coplanar, and the mating part is located between the first limit part and the second limit part.

* * * * *